United States Patent [19]
Baker

[11] 3,865,944
[45] Feb. 11, 1975

[54] TETRAHYDROPYRIDINE INSECT REPELLENT

[75] Inventor: Don R. Baker, Orinda, Calif.

[73] Assignee: Stauffer Chemical Company, New York, N.Y.

[22] Filed: May 4, 1973

[21] Appl. No.: 357,151

Related U.S. Application Data

[62] Division of Ser. No. 225,272, Feb. 10, 1972, Pat. No. 3,749,730.

[52] U.S. Cl. ............................ 424/263, 424/DIG. 10
[51] Int. Cl. ................................................ A01r 9/22
[58] Field of Search ............... 424/263, DIG. 10; 260/297 R

[56] References Cited
UNITED STATES PATENTS 3,209,006  9/1965  Wragg et al. .................... 260/297 R Primary Examiner—Vincent D. Turner
Attorney, Agent, or Firm—Edwin H. Baker

[57] ABSTRACT

Compounds of the formula

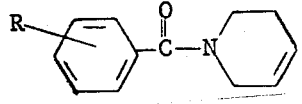

wherein R is alkyl having one to four carbon atoms, alkoxy having one to four carbon atoms or halogen and their use as insect repellents.

5 Claims, No Drawings

TETRAHYDROPYRIDINE INSECT REPELLENT

This application is a divisional of application Ser. No. 225,272, filed Feb. 10, 1972, now U.S. Pat. No. 3,749,730.

This invention relates to certain novel substituted benzoyl piperideines and their use as insect repellents.

The compounds of this invention have the formula

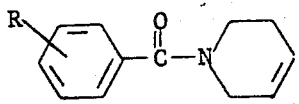

wherein R is alkyl having one to four carbon atoms, preferably methyl, more preferably m-methyl; alkoxy having one to four carbon atoms, preferably methoxy, more preferably o-methoxy or halogen, preferably chlorine or fluorine.

The compounds can be prepared by reacting a compound of the formula

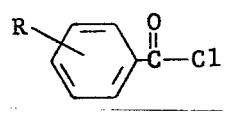

in which R is as defined with the compound 1,2,5,6 tetrahydropyridene having the formula

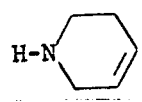

The 1,2,5,6 tetrahydropyridene is slowly added to a solution of the substituted benzoyl chloride in a solvent such as chloroform at a temperature under 30° C in the presence of HCl acceptor such as triethylamine.

Preparation of the compounds of this invention is illustrated by the following example

EXAMPLE I 1-(m-toluoyl)-1,2,5,6-tetrahydropyridine

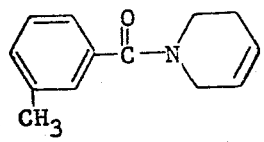

7.7 grams (0.05 mole) in toluoyl chloride is dissolved in 100 milliliters chloroform. 4.6 milliliters 1,2,5,6 tetrahydropyridine and 8.0 milliliters triethyl amine are added to the solution over a 10 minute period with cooling keeping the temperature under 30°C. The mixture is allowed to stand for 3 hours. The reaction product is recovered by washing the mixture with 100 milliliters water and 100 milliliters saturated $NaHCO_3$ solution. The washed mixture is dried over $MgSO_4$ and evaporated to yield 10.5 grams of a compound corresponding to the desired structure. $N_D^{30}$—1.5530. The structure is confirmed by n.m.r. 1-(o-fluorobenzoyl)-1,2,5,6-tetrahydropyridine, 1-(o-chlorobenzoyl)-1,2,5,6-tetrahydropyridine, 1-(p-bromobenzoyl)-1,2,5,6-tetrahydropyridine, 1-(p-butyl-benzoyl)-1,2,5,6-tetrahydropyridine, 1-(o-methoxybenzoyl)-1,2,5,6-tetrahydropyridine, and 1-(m-butoxybenzoyl)-1,2,5,6-tetrahydropyridine are also prepared in a similar manner, according to the general method described for preparing the compounds of this invention.

The following test description and results illustrate the use of the compounds of this invention as insect repellents.

HOUSE FLY REPELLENT TEST

Each test cage consists of a tule-covered, number 116, 16 oz. waxed paper Dixie cup with two three-fourths oz. waxed paper condiment cups stapled on opposite sides of the upper, interior perimeter. One of the cups contains a sugar cube saturated with 0.8 milliliters of acetone containing a specific concentration of the test repellent and allowed to dry. The second condiment cup contains a water-saturated cotton plug. After each cube has been treated and allowed to dry, it is carefully weighed and placed in the test cage. One hundred house flies of mixed sexes are then placed in the cages and all of the cages are placed on a 1½ rpm turntable. This procedure keeps the flies in random distribution within the cage and eliminates their gathering on the cage walls due to a phototropic response to outside light sources, which gathering has been found to give a false appearance of repellency by the sugar cube. At daily intervals after treatment, the flies in each cage are anesthesized with $CO_2$. The cube is removed, reweighed and the percentage weight loss of the cube (due to consumption by the flies) is recorded. The cubes with the least weight loss are considered to the most repellent to the flies. Table I contains a summary of the first, second, and fourth day readings for the candidate repellent at 1% concentration.

TABLE I

Percentage Weight Loss of Repellent Treated Sugar Cubes Due to Consumption by House Flies — 1% Concentration

| Compound | 24 hrs | 48 hrs | 96 hrs |
| --- | --- | --- | --- |
| 1-(m-Toluoyl)-1,2,5,6-Tetrahydropyridine | .02 | 6.6 | 20.0 |
| 1-(o-fluorobenzoyl)-1,2,5,6-tetrahydropyridine | .16 | 10.3 | 28.1 |
| 1-(o-chlorobenzoyl)-1,2,5,6-tetrahydropyridine | 1.7 | 10.7 | 26.4 |
| Acetone only (control) | 10.3 | 21.4 | 45.3 |

I claim:

1. A method of repelling houseflies comprising applying to the habitat thereof a repellent amount of a compound of the formula

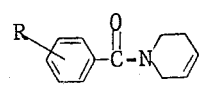

wherein R is alkyl having one to four carbon atoms, alkoxy having one to four carbon atoms or halogen.
2. The method of claim 1 where R is m-methyl.
3. The method of claim 1 where R is o-fluoro.
4. The method of claim 1 wherein R is o-chloro.
5. The method of claim 1 where R is m-methoxy.

* * * * *